(12) United States Patent
Cillessen et al.

(10) Patent No.: US 7,958,799 B1
(45) Date of Patent: Jun. 14, 2011

(54) BRAKE FOR GEAR CONE TRANSMISSION

(76) Inventors: James A. Cillessen, Arvada, CO (US); Gabriel A. Chihoski, Golden, CO (US)

( * ) Notice: Subject to any disclaimer, the term of this patent is extended or adjusted under 35 U.S.C. 154(b) by 411 days.

(21) Appl. No.: 12/267,652

(22) Filed: Nov. 10, 2008

(51) Int. Cl.
*F16H 3/20* (2006.01)
*F16D 55/32* (2006.01)
*B60W 10/18* (2006.01)

(52) U.S. Cl. ........... 74/348; 74/349; 188/72.4; 192/218; 192/221; 192/225; 477/210

(58) Field of Classification Search .................. None
See application file for complete search history.

(56) References Cited

U.S. PATENT DOCUMENTS

| | | |
|---|---|---|
| 918,773 A | 4/1909 | Schatz |
| 1,111,551 A | 9/1914 | Adams |
| 1,453,478 A | 5/1923 | Osborn |
| 1,471,162 A | 10/1923 | Iacobacci |
| 1,508,879 A | 9/1924 | Healey |
| 1,817,819 A | 8/1931 | Healey |
| 2,926,538 A | 3/1960 | Schafer |
| 3,058,365 A | 10/1962 | Gerchow |
| 3,485,329 A | 12/1969 | Hauser |
| 3,498,425 A | 3/1970 | Takada |
| 3,523,597 A | 8/1970 | Lemieux |
| 3,525,275 A | 8/1970 | Lemieux |
| 3,536,176 A | 10/1970 | Cappa |
| 3,572,479 A | 3/1971 | Kelley |
| 3,608,390 A | 9/1971 | Barrett |
| 3,702,571 A | 11/1972 | Sainz |
| 3,763,978 A | 10/1973 | Crooks |
| 3,772,940 A | 11/1973 | Ohtsuka et al. |
| 3,856,119 A | 12/1974 | Harrington |
| 3,926,073 A | 12/1975 | Roche et al. |
| 3,985,039 A | 10/1976 | Federspiel |
| 4,024,937 A | 5/1977 | Hoepfl et al. |
| 4,148,382 A | 4/1979 | Yamaoka et al. |
| 4,314,487 A | 2/1982 | Ahlen |
| 4,400,988 A | 8/1983 | Hagarty |
| 4,418,796 A | 12/1983 | Rittmann |
| 4,430,904 A | 2/1984 | Fogelberg |
| 4,433,762 A | 2/1984 | Prokop et al. |
| 4,466,303 A | 8/1984 | Stober |
| 4,592,455 A | 6/1986 | Bubak |
| 4,596,215 A | 6/1986 | Palesotti |
| 4,630,495 A | 12/1986 | Smith |
| 4,679,663 A | 7/1987 | Fogelberg |
| 4,776,238 A | 10/1988 | Premiski et al. |
| 4,796,728 A | 1/1989 | Kanengieter et al. |
| 4,831,889 A | 5/1989 | Howard |
| 4,883,151 A | 11/1989 | Tobler |
| 4,930,373 A | 6/1990 | Nakawaki et al. |

(Continued)

FOREIGN PATENT DOCUMENTS

DE   10317949   3/2008

(Continued)

*Primary Examiner* — David D Le
*Assistant Examiner* — Jacob S Scott
(74) *Attorney, Agent, or Firm* — Patent Law Offices of Rick Martin, P.C.

(57) ABSTRACT

A brake assembly is activated by a vehicle brake. The brake assembly is mounted upstream from a transmission and either up or downstream from a clutch. A controller for the transmission brake allows the driver to adjust both a transmission brake lead/lag time and force relative to the vehicle wheel brakes.

10 Claims, 7 Drawing Sheets

U.S. PATENT DOCUMENTS

| | | |
|---|---|---|
| 5,234,389 A | 8/1993 | Goates |
| 5,322,488 A | 6/1994 | Ra et al. |
| 5,326,334 A | 7/1994 | Ra et al. |
| 5,330,395 A | 7/1994 | Ra et al. |
| 5,364,320 A | 11/1994 | Ra et al. |
| 5,425,685 A | 6/1995 | Park |
| 5,460,578 A | 10/1995 | Giuriati et al. |
| 5,528,950 A | 6/1996 | Organek et al. |
| 5,653,143 A | 8/1997 | Langevin |
| 5,694,817 A | 12/1997 | Reid |
| 5,713,443 A | 2/1998 | Kronstadt |
| 5,713,445 A | 2/1998 | Davis et al. |
| 5,715,915 A | 2/1998 | Brinkmann et al. |
| 5,855,148 A | 1/1999 | Reid |
| 5,879,264 A | 3/1999 | Raghavan et al. |
| 5,928,102 A | 7/1999 | Park |
| 5,937,990 A | 8/1999 | DiGiacomo et al. |
| 5,953,959 A | 9/1999 | Organek et al. |
| 6,161,666 A | 12/2000 | Brown |
| 6,524,214 B1 | 2/2003 | Cillessen et al. |
| 6,543,305 B1 | 4/2003 | Van Cor |
| 6,594,573 B1 | 7/2003 | Rossmann et al. |
| 6,663,525 B1 | 12/2003 | McKee et al. |
| 6,699,153 B2 | 3/2004 | Biallas |
| 6,709,355 B2 | 3/2004 | O'Hora |
| 6,802,229 B1 | 10/2004 | Lambert |
| 6,814,196 B2 | 11/2004 | Voit |
| 6,889,801 B2 | 5/2005 | Severinsson et al. |
| 6,997,848 B1 | 2/2006 | Cillessen et al. |
| 7,198,587 B2 | 4/2007 | Samie et al. |
| 7,232,396 B2 | 6/2007 | Reisch et al. |
| 7,273,434 B1 | 9/2007 | Rossler |
| 7,337,052 B2 | 2/2008 | Steinborn et al. |
| 7,344,012 B2 | 3/2008 | Ward et al. |
| 2003/0168300 A1 | 9/2003 | Voit |
| 2003/0199356 A1 | 10/2003 | Biallas |
| 2004/0055837 A1 | 3/2004 | Severinsson et al. |
| 2004/0130211 A1 * | 7/2004 | Fagergren et al. ............ 303/191 |
| 2005/0215391 A1 | 9/2005 | Reisch et al. |
| 2006/0025279 A1 | 2/2006 | Kimes et al. |
| 2006/0060437 A1 | 3/2006 | Renner et al. |
| 2006/0142919 A1 | 6/2006 | Steinborn et al. |
| 2006/0175175 A1 | 8/2006 | Acosta |
| 2006/0179963 A1 | 8/2006 | Bachmann et al. |
| 2007/0161458 A1 | 7/2007 | Ward et al. |
| 2007/0176483 A1 | 8/2007 | Carswell et al. |
| 2007/0219042 A1 | 9/2007 | Moon |
| 2007/0219043 A1 | 9/2007 | Moon |
| 2007/0278856 A1 * | 12/2007 | Craig et al. ............. 303/122.09 |
| 2008/0045370 A1 | 2/2008 | Hemphill |
| 2008/0065300 A1 | 3/2008 | Petzold et al. |
| 2010/0072021 A1 * | 3/2010 | Kingston et al. ............. 192/218 |

FOREIGN PATENT DOCUMENTS

| | | |
|---|---|---|
| WO | WO2007034154 | 3/2007 |

* cited by examiner

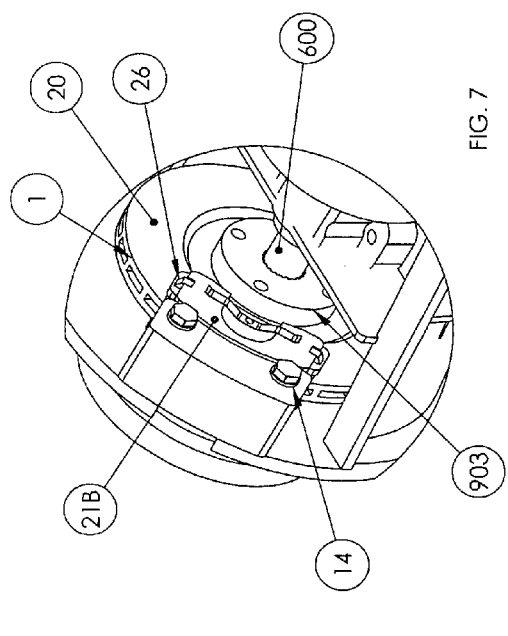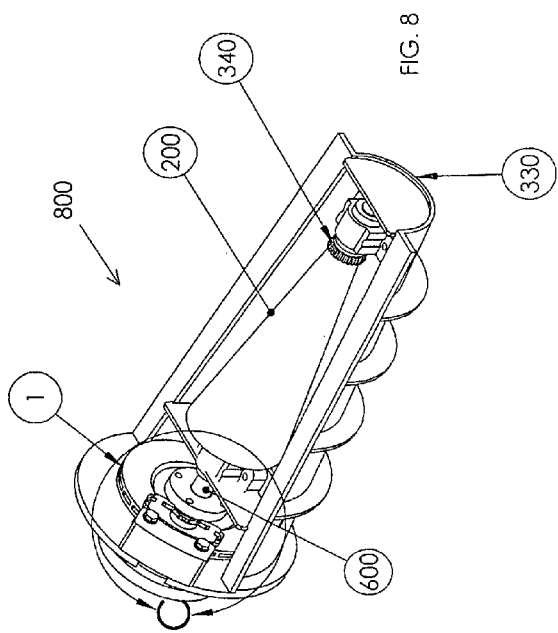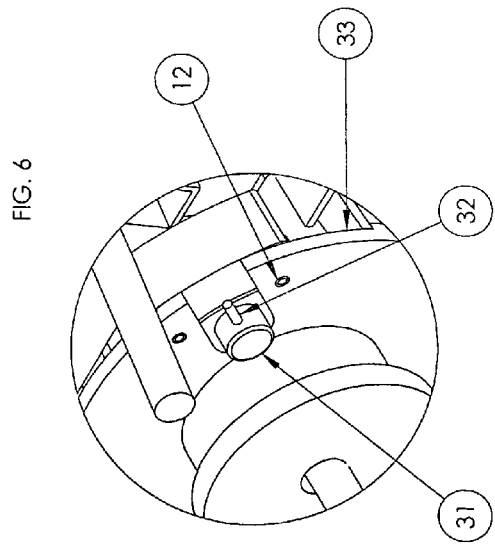

BRAKE FOR GEAR CONE TRANSMISSION

FIELD OF INVENTION

The present invention relates to improving the art of variable ratio gear cone transmissions by means of adding a disc brake to the assembly to reduce wear on the wheel brakes of the vehicle.

BACKGROUND OF THE INVENTION

U.S. Pat. No. 5,653,143 (1997) to Langevin (incorporated herein by reference) discloses a transmission system having a compact cluster of tapered gears that are selectively engagable with a selector gear.

Such transmissions are suited for heavy trucks which require large braking forces when going downhill.

A summary of relevant art follows below:

U.S. Pat. No. 5,653,143 (1987) to Langevin discloses a cone shaped plurality of driven gears with a drive gear movable along a fork dolly. The invention focuses on rapidly moving the drive gear in 0.01 second between driven gears while controlling the shift to occur only when proper load and mesh conditions are met. There is no reverse gear shown. There is no disc brake (braking using engine) mechanism shown.

U.S. Pat. No. 918,773 (1909) to Schatz discloses a gear cone for a machine tool.

U.S. Pat. No. 1,111,551 (1914) to Adams discloses a vehicle transmission using a gear cone. A sliding drive gear changes the speed of the driven cone. The cone gears have an internal clutch. A reverse gear is shown, idler gear 37, shaft 36 and gear 38 on sleeve 7. No brake is shown.

U.S. Pat. No. 1,191,771 (1916) to Delacour discloses a gearless, smooth cone driven by the motor. The driven gear G is moved along the cone.

U.S. Pat. No. 1,453,478 (1923) to Osborn discloses a traveling gear driven by the engine. The driven gears are a cone configuration. FIG. 3 shows a reverse gear assembly.

U.S. Pat. No. 1,471,162 (1923) to Iacobacci discloses a gear cone transmission. The driving gear moves along the driven gear cone. A reverse is shown.

U.S. Pat. No. 1,508,879 (1924) to Healey discloses a gear cone transmission and clutch means.

U.S. Pat. No. 1,817,819 (1931) to Healey discloses a gear cone transmission and clutch for a machine tool.

U.S. Pat. No. 2,926,538 (1960) to Schafer discloses a high speed gear cone transmission.

U.S. Pat. No. 3,058,365 (1962) to Gerchow discloses a machine tool gear cone transmission.

U.S. Pat. No. 3,608,390 (1971) to Barrett discloses a smooth face cone transmission.

U.S. Pat. No. 3,702,571 (1972) to Sainz discloses a vehicle transmission with a gear cone. Two driver shafts are shown.

U.S. Pat. No. 4,630,495 (1986) to Smith discloses a concave, parabolic cone transmission.

U.S. Pat. No. 4,831,889 (1989) to Howard discloses a bicycle gear cone drive. U.S. Pat. No. 5,425,685 (1995) to Park discloses a smooth cone transmission. U.S. Pat. No. 6,543,305 (2003) to Van Cor discloses a cone with conic and scaling teeth.

U.S. Pat. No. 6,709,355 (2004) to O'Hora discloses a continuously variable cone transmission.

U.S. Pat. No. 6,802,229 (2004) to Lambert discloses a continuously variable cone transmission with a helical rack.

U.S. Pat. No. 7,232,396 (2007) and Pub. No. US/2005/0215391 to Reisch et al. discloses a dual cone transmission.

WO 2007/034154 discloses a bicycle cone drive.

What is needed in the art is an alternative braking system to augment and/or replace the braking force provided by the engine and gears during a downshift operation.

Downshifting adds wear to the transmission, engine and clutch. The present invention reduces this wear by providing a driver actuated disc brake in the transmission assembly.

SUMMARY OF THE INVENTION

The main aspect of the present invention is to provide a disc brake in a gear cone transmission.

Another aspect of the present invention is to provide a reverse gear assembly in the transmission.

Another aspect of the present invention is to provide a separate casing for the disc brake to avoid a contamination by transmission fluid.

Another aspect of the present invention is to provide a means to proportion a brake pedal to power both the wheel brakes and the transmission brake in a driver selected proportion.

Other aspects of this invention will appear from the following description and appended claims, reference being made to the accompanying drawings forming a part of this specification wherein like reference characters designate corresponding parts in the several views.

A gear cone transmission has N number of descending diameter cluster gears which are driven by an engine and clutch assembly. A driven output gear moves up and down the cluster of gears under driver control. Upstream from the transmission and connected thereto is a disc brake assembly (preferably) powered by a hydraulic cylinder activated by the vehicle brake pedal.

A proportional valve balances the hydraulic output of the transmission brake slave cylinder to the driver's set point. The same brake pedal activates the wheel brake master cylinders in a known manner.

BRIEF DESCRIPTION OF THE DRAWINGS

FIG. 6 is a perspective view of the slave cylinder.

FIG. 7 is a perspective view of the opposite side of the caliper from the slave cylinder.

FIG. 8 is a top perspective partial cutaway view of a smooth embodiment.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
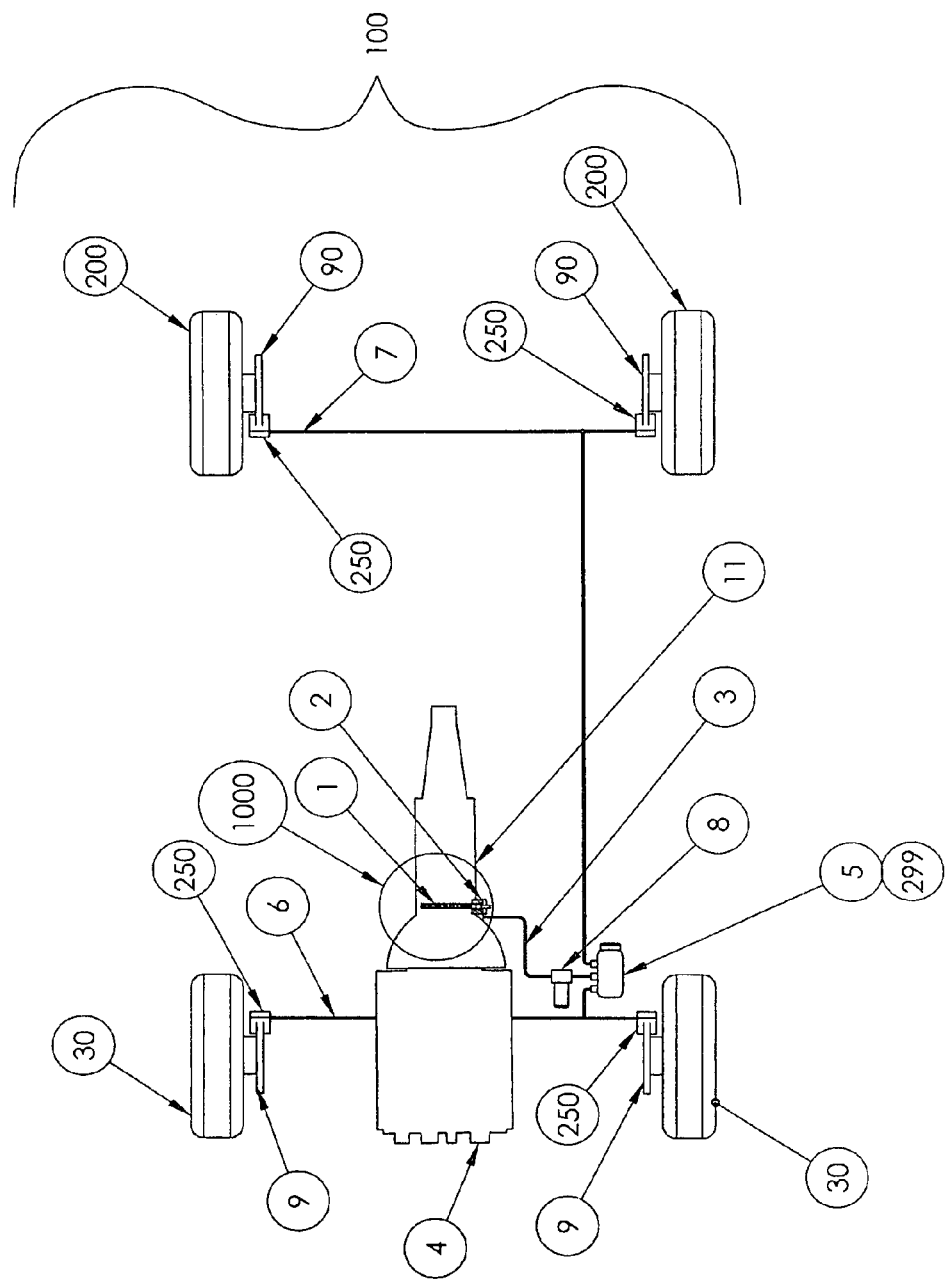
FIG. 1 is a top plan schematic view of a vehicle installed with the present invention.

Referring first to FIG. 1 the vehicle 100 has front wheels 30 and driven rear wheels 200. Front brakes 9 and rear brakes 90 are controlled by a hydraulic master cylinder 5. The front brakes hydraulic line 6 and rear brakes hydraulic line 7 are connected to the hydraulic master cylinder 5. The hydraulic master cylinder (or array of multiple cylinders) also powers a transmission based disc brake assembly 1,2 A proportional valve 8 provides the driver with a power adjustment for hydraulic pressure via line 3 to the brake caliper 2 which contacts the brake disc 1 upon depression of the driver's brake pedal.

The engine 4 powers a gear cone transmission 11 to power the driven wheels 200. In operation the driver sets the proportional valve 8 to a desired setting. When the driver applies force to the brake pedal, the wheel brakes 9, 90 are activated along with the transmission disc brake assembly 1000. Thus, the powered wheels (either rear as shown or four wheel drive) get a second braking force from the transmission brake assembly 1000. The result is less wear on the wheel brakes 9, 90 and the transmission 11.

Figure 2:
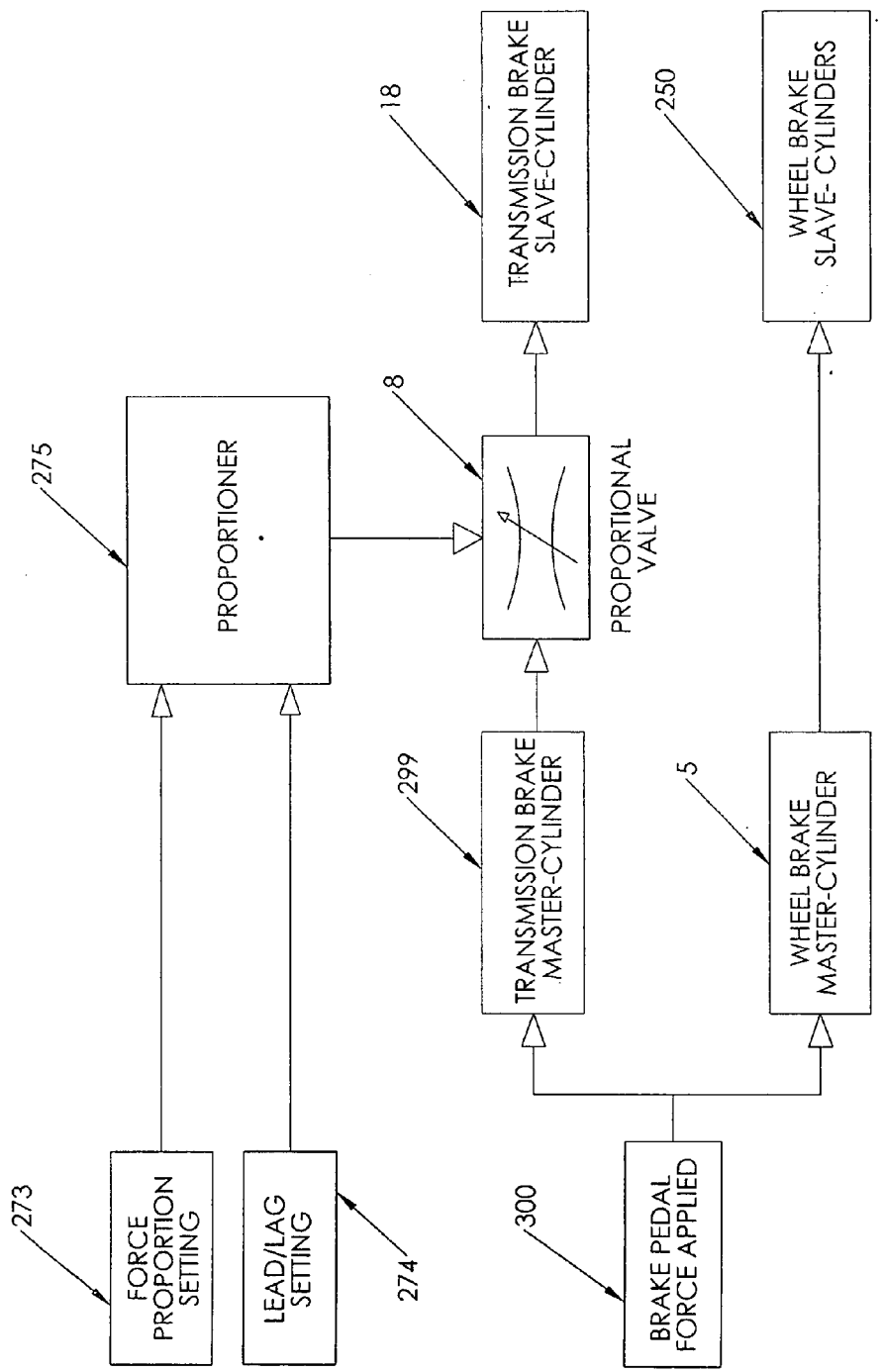
FIG. 2 is a flow chart of the control logic for the present invention.

Referring next to FIG. 2 the driver adjusts a transmission brake proportion setting 273 and a transmission brake activation lead/lag setting 274 as desired. The settings 273, 274 control the hydraulic proportioner 275 which in turn controls the proportional valve 8 shown in FIG. 1. The transmission brake slave cylinder 31 (shown in FIG. 6) controls the caliper 2 (FIG. 1).

The brake pedal force 300 simultaneously controls the wheel brake master cylinder 5 (shown in FIG. 1) which in turn controls the wheel brake slave cylinders 250.

Figure 3:
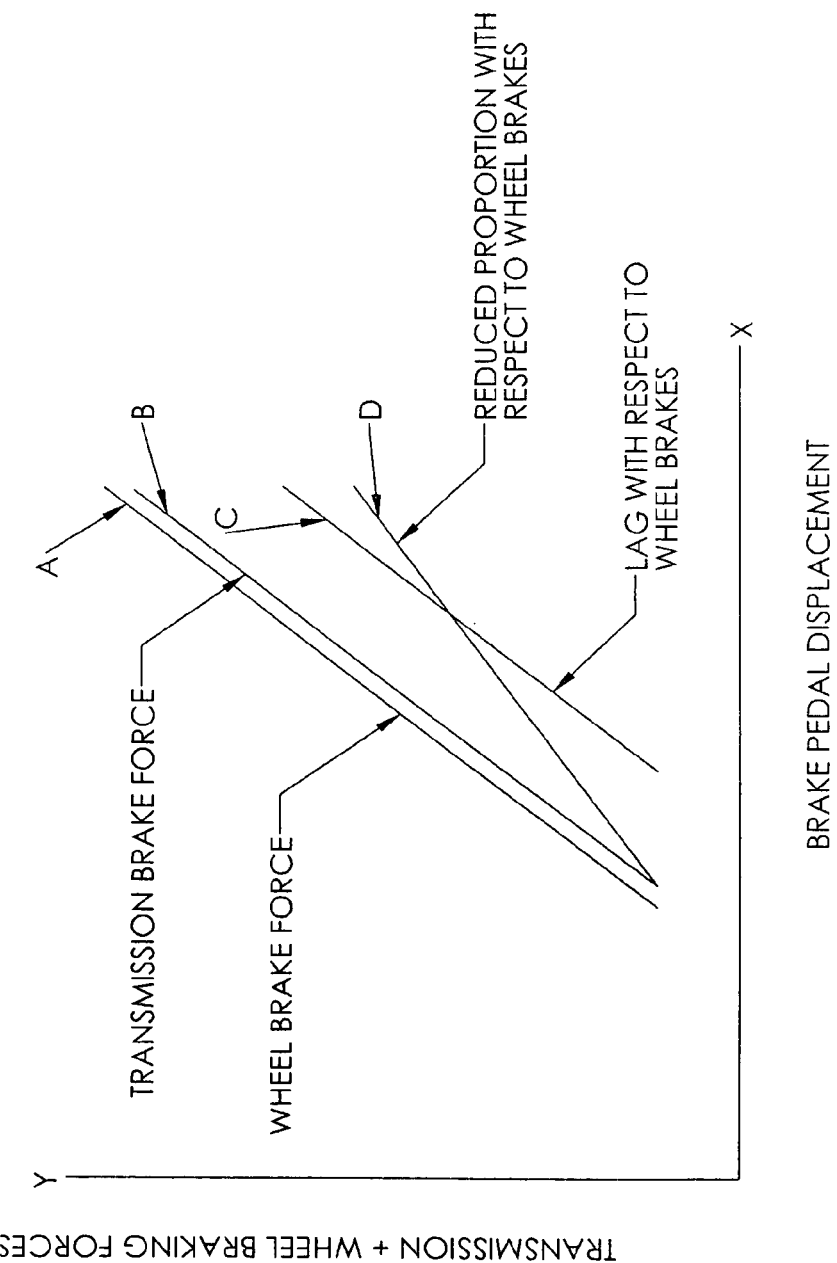
FIG. 3 is a chart of brake pedal displacement resulting in various combinations of wheel and transmission braking force.

Referring next to FIG. 3 the X axis shows brake pedal displacement. The Y axis shows both the transmission brake force and the wheel brake force. One setting of controls 273, 274 of FIG. 2 results in similar forces A and B. However, line C shows a lag of the transmission brake force with respect to the wheel brake force caused by adjusting setting 274 of FIG. 2. Line D shows the concurrent forces between the transmission and wheel brakes, but the transmission force increases at a lesser rate with respect to the wheel brakes by adjusting setting 273 of FIG. 2.

Figure 4:
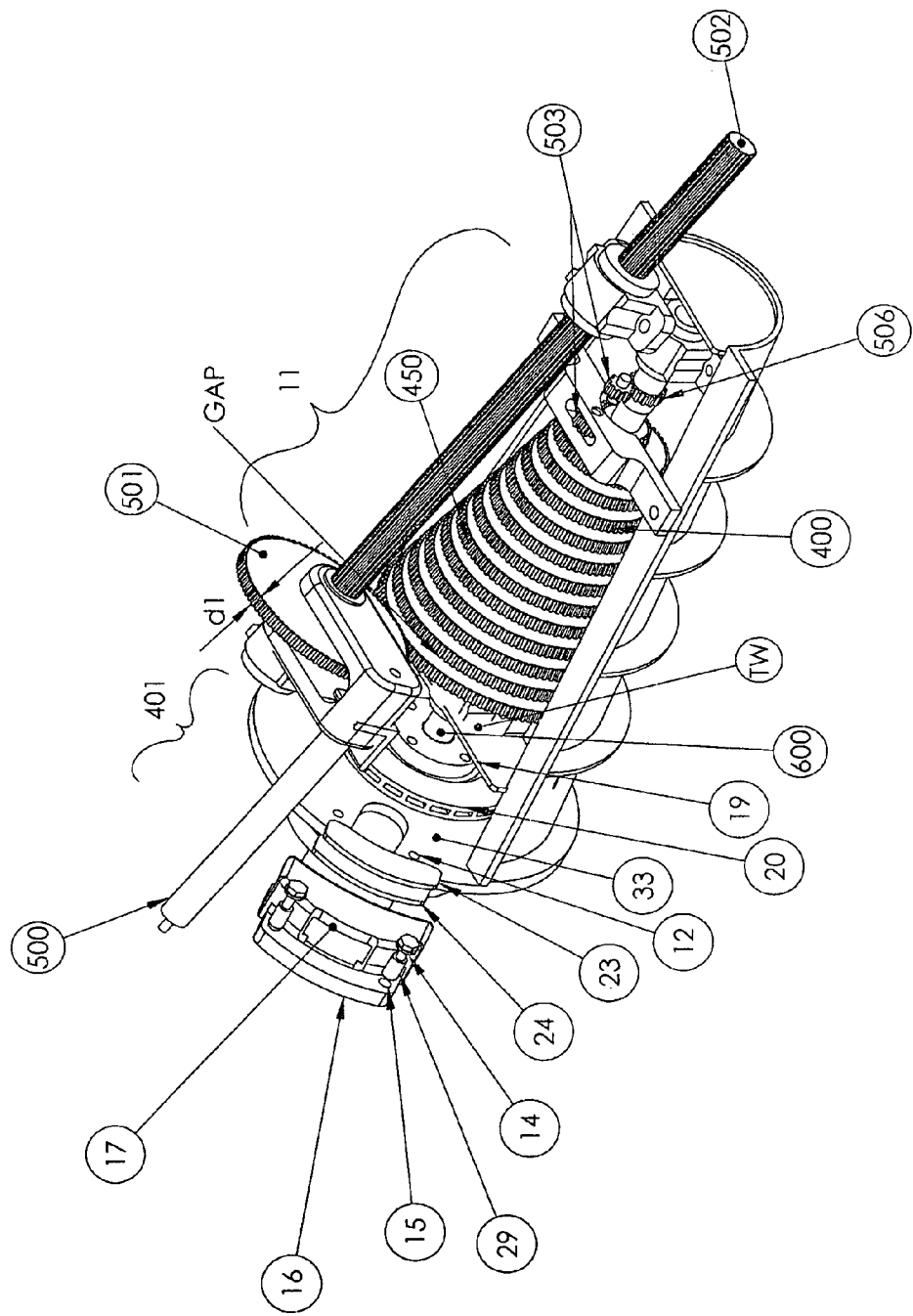
FIG. 4 is a top perspective view of the preferred embodiment.

Referring next to FIG. 4 the transmission wall TW separates an oil filled chamber 400 from the dry brake chamber 401. Clustered gears 450 are driven by engine 4 by means of a clutch (not shown). Preferably gap GAP is greater than thickness d1 of the output gear 501.

The output gear 501 moves to the chosen cluster gear 450 by means of the hydraulic actuator 500. Output gear 501 drives the output shaft 502 to the powered wheels. A reverse gear assembly 503 is turned in an opposite direction from gears 450 due to its swing gear 506.

The main drive shaft 600 of the transmission 11 rotates the brake disc 20. A slave cylinder 31 (FIG. 6) moves the caliper 16 (FIG. 4) which supports the brake pads 23, 24. Bolts 14 in slide shaft 29 support the brake pads 23,24 in the caliper 16. A transmission brake inspection window 17 allows a maintenance inspection of the pads 23,24. Caliper mounting holes 12 support the caliper 16 on transmission housing 33.

Figure 5:
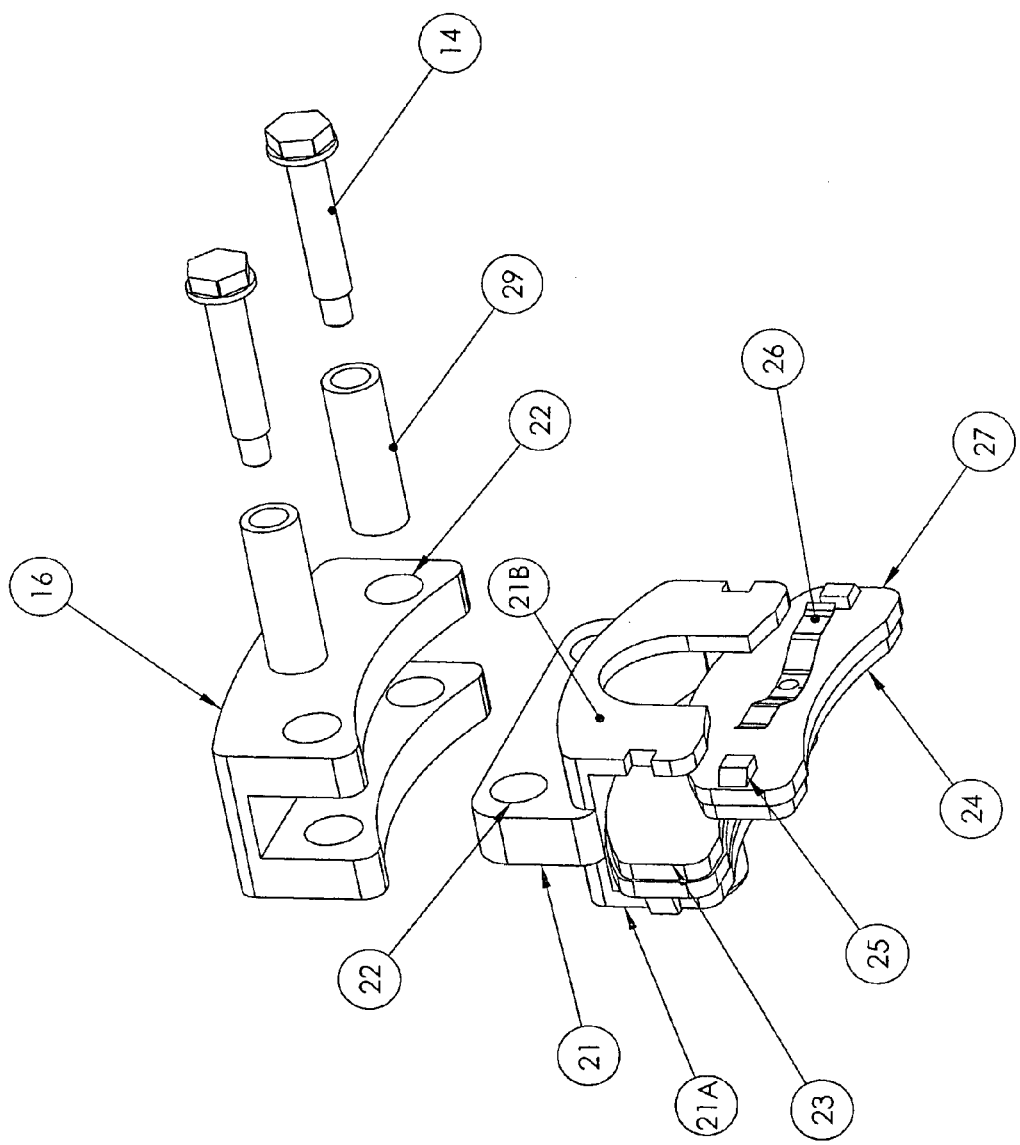
FIG. 5 is a exploded view of the disc brake assembly.

In FIGS. 5, 6, 7 the brake mount (also called the caliper) 16 supports a brake hanger 21 via slide bores 22. The brake hanger 21 has arms 21a, 21b that support the brake pads, the inboard pad 23 and the outboard pad 24. Spring clip 26 on pad mounting plate 27 can be seen for pad 24. Pad 23 is hydraulically moved against the disc 20 by a slave cylinder with a piston 31 shown in FIG. 6. Hydraulic line 32 feeds piston slave cylinder 31.

FIG. 8 shows a smooth cone transmission 800 with a smooth cone 200. A low ratio gear 340 provides maximum torque at slowest OUTPUT speeds.

The brake assembly 1 is the same as for the geared transmission shown in FIG. 4 However, both the smooth cone 200 and the brake assembly 1 can share a compartment 330 that is air filled, not oil filled. The details of this smooth cone transmission are incorporated herein by reference via U.S. Pat. Nos. 6,997,848 and 6,524,214. The controls for brake assembly 1 can be those shown in FIG. 2.

Figure 9:
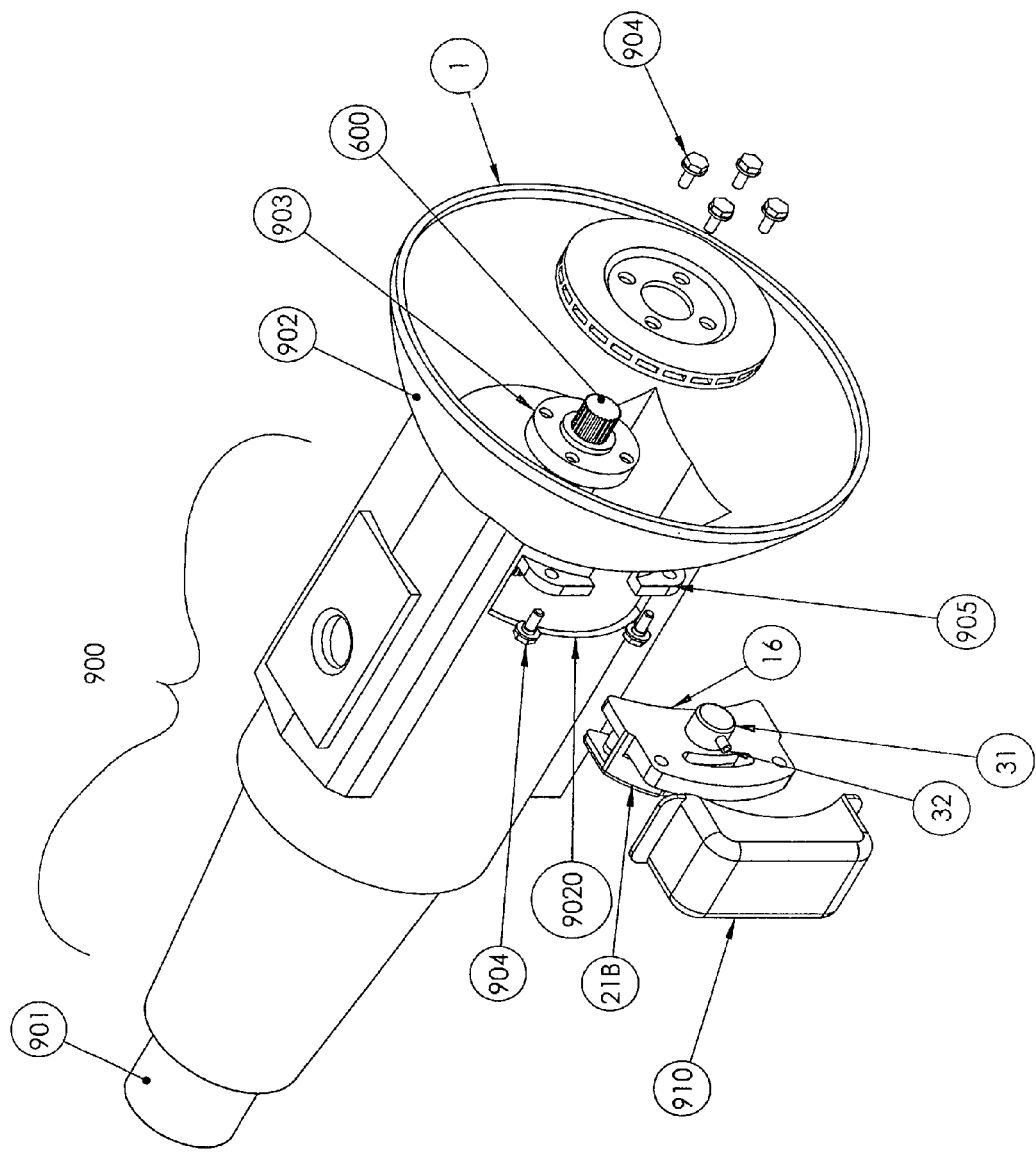
FIG. 9 is a perspective view of a standard transmission with the brake assembly.

Referring next to FIG. 9 a prior art transmission 900 has an output drive shaft 901. An oil-less upstream chamber 902 extends downstream to flange 9020. Inside the chamber 902 is a brake assembly 1. A collar 903 rotates with engine/clutch drive shaft 600. The bolts 904 secure the rotor 20 to the drive shaft 600. Mounting ears 905 and bolts 904 secure the brake mount 16 to the transmission 900. A housing 910 protects the brake pads and associated parts. The controls may be those shown in FIG. 2.

U.S. Pat. No. 4,231,455 (1980) to Fuehrer is incorporated herein by reference to teach a related braking concept of braking an output of a transmission in any gear with a relationship to operator brake pressure, see especially FIGS. 1, 4. The backing plate and spring loaded friction plate transmission brake shown is equivalent to the rotor/caliper type brake disclosed herein.

The brake assembly 1 applies a braking force to the clutch output drive shaft prior to the shaft entering the transmission 900. This action creates an effect similar to increasing the compression ratio of the engine regardless of what gear the transmission is in when the brake pedal is depressed.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A brake assembly for a cone type transmission, said transmission having an input drive shaft and an output driven shaft, the brake assembly comprising:
   a rotor means secured to the input drive shaft functioning to receive a friction braking force;
   a caliper means attached to the transmission functioning to provide the friction braking force against the rotor means;
   a control means functioning to activate the caliper means in relation to a position of a brake pedal; and
   wherein said control means further comprises an adjustable brake pedal position to transmission brake force ratio and an adjustable brake pedal position to transmission brake lead/lag setting.

2. The apparatus of claim 1, wherein the brake assembly is mounted in an oil-less chamber upstream of the cone transmission.

3. The apparatus of claim 2, wherein the caliper means further comprises a hydraulically operated brake pad.

4. The apparatus of claim 2, wherein the control means further comprises a proportioner having a transmission force proportion setting and a lead/lag setting said proportioner controlling a proportional valve which in turn controls a transmission brake slave cylinder which in turn controls the caliper means.

5. The apparatus of claim 4, wherein the one type transmission further comprises a gear cone transmission with a geared cone operating in an oil bath environment.

6. The apparatus of claim 4, wherein the cone type transmission further comprises a smooth cone transmission with a smooth cone operating in an oil-less environment.

7. A brake assembly for a transmission, said transmission having an input drive shaft and an output driven shaft, the brake assembly comprising:
- a rotor means secured to the input drive shaft functioning to receive a friction braking force;
- a caliper means attached to the transmission functioning to provide the friction braking force against the rotor means;
- a control means functioning to activate the caliper means in relation to a position of a brake pedal; and
- wherein said control means further comprises an adjustable brake pedal position to transmission brake force ratio and an adjustable brake pedal position to transmission brake lead/lad setting.

8. The apparatus of claim 7, wherein the brake assembly is mounted in an oil-less chamber upstream of the transmission.

9. The apparatus of claim 8, wherein the caliper means further comprises a hydraulically operated brake pad.

10. The apparatus of claim 8, wherein the control means further comprises a proportioner having a transmission force proportion setting and a lead/lag setting, said proportioner controlling a proportional valve which in turn controls a transmission brake slave cylinder which in turn controls the caliper means.

\* \* \* \* \*